US010861234B2

(12) United States Patent
Wang

(10) Patent No.: US 10,861,234 B2
(45) Date of Patent: Dec. 8, 2020

(54) CURVED SURFACE MODEL GENERATION METHOD AND APPARATUS

(71) Applicant: TENCENT TECHNOLOGY (SHENZHEN) COMPANY LIMITED, Shenzhen (CN)

(72) Inventor: Honghao Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/420,054

(22) Filed: May 22, 2019

(65) Prior Publication Data

US 2019/0272672 A1 Sep. 5, 2019

Related U.S. Application Data

(63) Continuation of application No. PCT/CN2018/073586, filed on Jan. 22, 2018.

(30) Foreign Application Priority Data

Feb. 9, 2017 (CN) .......................... 2017 1 0071281

(51) Int. Cl.
G06T 17/10 (2006.01)
G06T 17/30 (2006.01)
(52) U.S. Cl.
CPC .............. G06T 17/30 (2013.01); G06T 17/10 (2013.01)
(58) Field of Classification Search
CPC ..................... G06T 15/04; G06T 17/00–30
See application file for complete search history.

(56) References Cited

U.S. PATENT DOCUMENTS 5,459,821 A 10/1995 Kuriyama et al.
2005/0128210 A1* 6/2005 Berger .................. G06F 3/1446
345/582

(Continued)

FOREIGN PATENT DOCUMENTS

CN 101937579 A 1/2011
CN 102117501 A 7/2011

(Continued)

OTHER PUBLICATIONS

De Toni, Rodrigo, Fernando Marson, and Vinicius J. Cassol. "Dynamic terrains applying pseudo-infinity and synthesized by Bezier curves." 2016. (Year: 2016).*

(Continued)

Primary Examiner — Daniel F Hajnik
(74) Attorney, Agent, or Firm — Anova Law Group, PLLC

(57) ABSTRACT

A curved surface model generation method and apparatus in a three-dimensional (3D) scenario are provided. The method includes obtaining a curved surface parameter inputted for a to-be-generated curved surface model; and obtaining two-dimensional coordinates of a plurality of sampling points. A first dimensional direction of each sampling point is a direction of a chord corresponding to an arc at a radial cross section of the curved surface model. A second dimensional direction is a curved-surface width direction of the curved surface model. The method also includes determining, for each sampling point, a coordinate value of the sampling point in a third dimensional direction based on the curved surface parameter, the third dimensional direction being perpendicular to the first dimensional direction and the second dimensional direction; and generating the curved surface model based on coordinate values of each sampling point in the first, second, and third dimensional directions.

20 Claims, 6 Drawing Sheets

(56) References Cited

U.S. PATENT DOCUMENTS

2010/0295849 A1 11/2010 Chai et al.
2016/0055266 A1 4/2016 Kawakami et al.

FOREIGN PATENT DOCUMENTS

| CN | 103325135 A | 9/2013 |
| CN | 104778741 A | 7/2015 |
| CN | 104915993 A | 9/2015 |
| CN | 106846490 A | 6/2017 |
| JP | 2016045781 A | 4/2016 |

OTHER PUBLICATIONS

NPL Video Titled "06 Terrain UV Mapping and Texture Baking", Published Dec. 7, 2015; available for viewing at: https://www.youtube.com/watch?v=Y-wK3anRMhk; select screenshots included. (Year: 2015).*
The World Intellectual Property Organization (WIPO) International Search Report for PCT/CN2018/073586 dated Apr. 4, 2018 5 Pages (including translation).
The State Intellectual Property Office of the People's Republic of China (SIPO) Office Action 1 for 201710071281.3 dated Mar. 5, 2019 8 Pages (including translation).
Jianjun Chen et al; "Geometry-based Adaptive Surface Mesh Generation for STL Models", Journal of Mechanical Engineering, vol. 47, issue 7, Apr. 30, 2011 (Apr. 30, 2011), pp. 128-133. 6 Pages.
Shiqi Peng et al; "Learning-Based Super-Resolution of 3D Face Model", IEEE International Conference on Image Processing 2005, vol. 2, Nov. 14, 2005 (Nov. 14, 2005), pp. 1-4. 4 Pages.

* cited by examiner

CURVED SURFACE MODEL GENERATION METHOD AND APPARATUS

RELATED APPLICATIONS

This application is a continuation application of PCT Patent Application No. PCT/CN2018/073586, filed on Jan. 22, 2018, which claims priority to Chinese Patent Application No. 201710071281.3, entitled "CURVED SURFACE MODEL GENERATION METHOD AND APPARATUS" filed with the China National Intellectual Property Administration on Feb. 9, 2017, the entire contents of both of which are incorporated herein by reference.

FIELD OF TECHNOLOGY

This application relates to the field of model generation technologies, and more specifically, to generation of a curved surface model in a three-dimensional (3D) scenario.

BACKGROUND OF THE DISCLOSURE

As a 3D technology develops, 3D application services have sprung up widely. Common 3D application services are virtual reality (VR) games and the like.

Generally, there is a plurality of object models in a 3D application service scenario. A conventional practice is to place a planar object model in the 3D scenario, to be integrated with the scenario. However, in such a processing manner, there are problems of insufficient 3D visualization, a lack of strong expressiveness, and the like. If a planar object model is replaced with a curved surface object model, expressiveness of the object model in the 3D scenario can be greatly improved, and for VR games, a feeling of immersion of a user can be greatly improved.

In a conventional curved surface model generation method, generally, a user needs to provide a large amount of 3D point cloud data, to generate a curved surface model by using the 3D point cloud data. For the user, the user needs to provide excessive data, and a radian and a size of the generated curved surface model cannot be effectively controlled, leading to insufficient flexibility.

SUMMARY

In view of this, this application provides a curved surface model generation method and apparatus in a 3D scenario, to resolve problems existing in a conventional curved surface model generation method that a user needs to provide a large amount of 3D point cloud data, and a radian and a size of a generated curved surface model cannot be controlled.

To achieve the foregoing objectives, currently provided solutions are as follows:

One aspect of embodiments of this application provides a curved surface model generation method in a 3D scenario. The method includes obtaining, by a computing device, a curved surface parameter inputted for a to-be-generated curved surface model; and obtaining, by the computing device, two-dimensional coordinates of a plurality of sampling points. A first dimensional direction of each sampling point is a direction of a chord corresponding to an arc at a radial cross section of the curved surface model, and a second dimensional direction of each sampling point is a curved-surface width direction of the curved surface model. The method also includes determining, for each sampling point, a coordinate value of the sampling point in a third dimensional direction based on the curved surface parameter, the third dimensional direction being perpendicular to the first dimensional direction and the second dimensional direction; and generating, by the computing device, the curved surface model based on coordinate values of each sampling point in the first dimensional direction, the second dimensional direction, and the third dimensional direction.

Another aspect of the embodiments of this application provides a curved surface model generation apparatus in a 3D scenario, including a memory and a processor coupled to the memory. The processor is configured to obtain a curved surface parameter inputted for a to-be-generated curved surface model; and obtain two-dimensional coordinates of a plurality of sampling points. A first dimensional direction of each sampling point is a direction of a chord corresponding to an arc at a radial cross section of the curved surface model, and a second dimensional direction of each sampling point is a curved-surface width direction of the curved surface model. The processor is also configured to determine, for each sampling point, a coordinate value of the sampling point in a third dimensional direction based on the curved surface parameter, the third dimensional direction being perpendicular to the first dimensional direction and the second dimensional direction; and generate the curved surface model based on coordinate values of each sampling point in the first dimensional direction, the second dimensional direction, and the third dimensional direction.

Another aspect of the embodiments of this application provides a non-transitory computer-readable storage medium storing computer program instructions executable by at least one processor. The computer program instructions cause the at least one processor to perform: obtaining a curved surface parameter inputted for a to-be-generated curved surface model; and obtaining two-dimensional coordinates of a plurality of sampling points. A first dimensional direction of each sampling point is a direction of a chord corresponding to an arc at a radial cross section of the curved surface model, and a second dimensional direction of each sampling point is a curved-surface width direction of the curved surface model. The computer program instructions also cause the at least one processor to perform: determining, for each sampling point, a coordinate value of the sampling point in a third dimensional direction based on the curved surface parameter, the third dimensional direction being perpendicular to the first dimensional direction and the second dimensional direction; and generating the curved surface model based on coordinate values of each sampling point in the first dimensional direction, the second dimensional direction, and the third dimensional direction.

According to the curved surface model generation method in a 3D scenario provided in the embodiments of this application, a terminal only needs to input a curved surface parameter of a to-be-generated curved surface model. On this basis, in the embodiments of this application, two-dimensional coordinates of a plurality of sampling points are obtained, a first dimensional direction of the sampling point being a direction of a chord corresponding to an arc at a radial cross section of the curved surface model, and a second dimensional direction of the sampling point being a curved-surface width of the curved surface model; for each sampling point, a coordinate value of the sampling point in a third dimensional direction may be determined based on the curved surface parameter, the third dimensional direction being perpendicular to the first dimensional direction and the second dimensional direction; and the curved surface model is generated based on coordinate values of each sampling point in the first dimensional direction, the second dimensional direction, and the third dimensional direction. It can be learned that, only the curved surface parameter of the to-be-generated curved surface model needs to be provided. In the embodiments of this application, several sampling points can be automatically obtained, a coordinate value of the sampling point in the third dimensional direction is determined by using a geometrical relationship, to accordingly obtain 3D coordinate values of each sampling point, and the curved surface model is generated based on the 3D coordinates of the sampling point. In the embodiments of this application, a large amount of point cloud data does not need to be provided, and a curved surface model of a required curved surface parameter can be generated.

BRIEF DESCRIPTION OF THE DRAWINGS

To describe the technical solutions of the embodiments of this application or the existing technology more clearly, the following briefly describes the accompanying drawings required for describing the embodiments or the existing technology. Apparently, the accompanying drawings in the following description show only some embodiments of this application, and a person of ordinary skill in the art may still derive other drawings from the provided accompanying drawings without creative efforts.

DESCRIPTION OF EMBODIMENTS

The following clearly and completely describes the technical solutions in the embodiments with reference to the accompanying drawings in the embodiments. Apparently, the described embodiments are merely some but not all of the embodiments of this application. All other embodiments obtained by a person of ordinary skill in the art based on the embodiments of this application without creative efforts shall fall within the protection scope of this application.

The embodiments of this application disclose a solution of generating a curved surface model in a 3D model. A curved surface model generated by using the solution is applicable to a 3D scenario for display and the like. In the solution of generating a curved surface model in a 3D model provided in the embodiments of this application, a curved surface parameter of a to-be-generated curved surface model may be specified, for example, a radian, a curved surface width, and an arc chord length, and other data does not need to be input. A process of generating the curved surface model is simpler, and the radian and a size of the generated curved surface model can be controlled.

Figure 1:
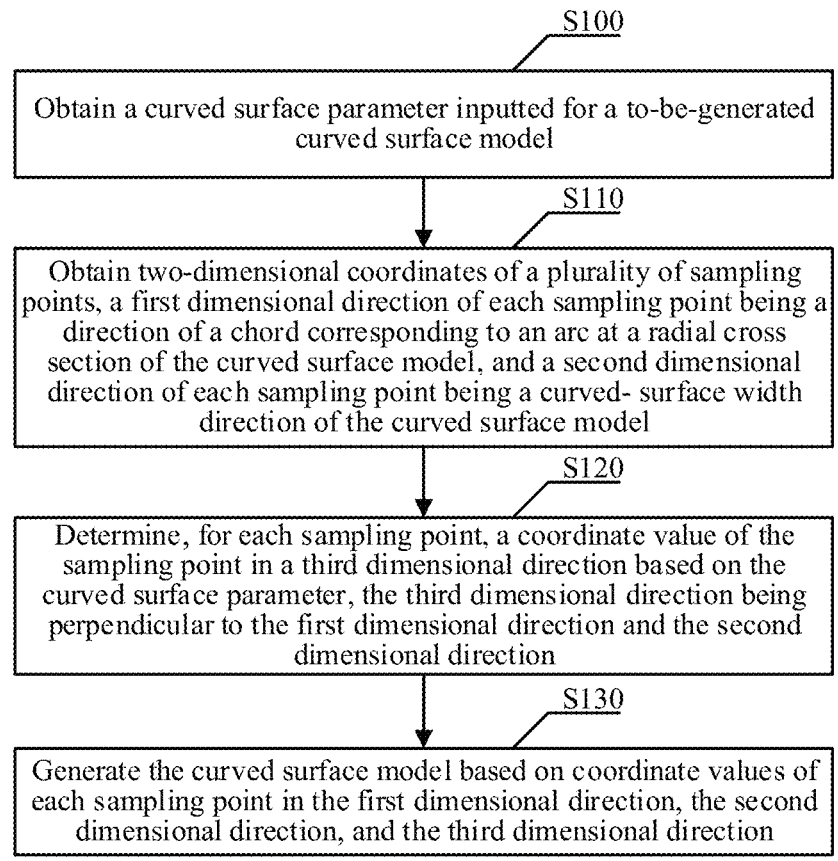
FIG. 1 is a flowchart of a curved surface model generation method in a 3D model according to an embodiment of this application.

Next, a curved surface model generation method in a 3D scenario in an embodiment of this application is described. One embodiment of this application is applicable to a server or any proper computing device. As shown in FIG. 1, the method includes the following steps:

Step S100: Obtain a curved surface parameter inputted for a to-be-generated curved surface model.

In one embodiment of this application, the curved surface parameter may include a radian of a curved surface model, a curved surface width, and an arc chord length. The arc chord length is a length of a chord corresponding to an arc at a radial cross section of the curved surface model.

Figure 2A:
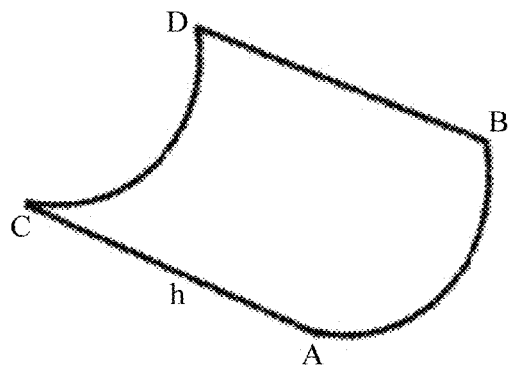
FIG. 2a exemplarily shows a curved surface model.
Figure 2B:
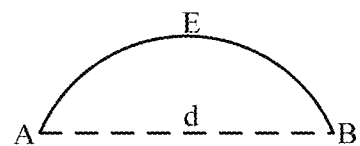
FIG. 2b exemplarily shows a radial cross section of the curved surface model.
Figure 2C:
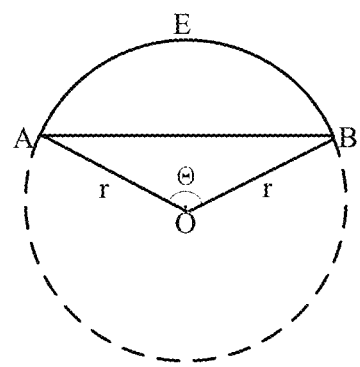
FIG. 2c exemplarily shows a radian of an arc at the radial cross section of the curved surface model.

Referring to FIG. 2a to FIG. 2c. FIG. 2a exemplarily shows a curved surface model. Four angles of the curved surface model are respectively A, B, C, and D. A curved-surface width of the curved surface model may be understood as a length h of AC.

FIG. 2b exemplarily shows a radial cross section of the curved surface model. The radial cross section includes an arc AEB. A length of a chord AB corresponding to the arc AEB is d. The length d of the chord AB may also be referred to as an arc chord length.

FIG. 2c exemplarily shows a radian of an arc at the radial cross section of the curved surface model. A line connects a circle center O of a circle in which the arc AEB is located to two ends of the arc AEB. An angle θ formed by OA and OB is a radian of the curved surface model.

The radian and a size of the curved surface model can be controlled by using the radian, the curved surface width, and the arc chord length. In this step, a user inputs, according to a requirement thereof, the radian, the curved surface width, and the arc chord length of the to-be-generated curved surface model.

Step S110: Obtain two-dimensional coordinates of a plurality of sampling points, a first dimensional direction of the sampling point being a direction of a chord corresponding to an arc at a radial cross section of the curved surface model, and a second dimensional direction of the sampling point being a curved-surface width direction of the curved surface model.

For ease of understanding, in some embodiments of this application, it is assumed that in a spatial 3D coordinate system, an X coordinate is fixed to 0, a planar rectangle is drawn in a YOZ plane, a width of the planar rectangle is the arc chord length d, and a height of the planar rectangle is a curved surface width h of the to-be-generated curved surface model. A width direction of the planar rectangle is the first dimensional direction and is assumed to be a Y-axis direction; and a height direction of the planar rectangle is the second dimensional direction and is assumed to be a Z-axis direction. Several sampling points are obtained from the planar rectangle. Therefore, a coordinate value of the sampling point in the first dimensional direction falls within a range of 0 to the arc chord length d, and a coordinate of the sampling point in the second dimensional direction falls within a range of 0 to the curved surface width h.

Apparently, if Y and Z coordinate values of each sampling point remain unchanged, but an X coordinate is no longer fixed to 0, and an X coordinate value of each sampling point uniformly corresponds to an arc-shaped line segment, the sampling points form a curved surface.

Therefore, in some embodiments of this application, two-dimensional coordinate values of the several sampling points may be obtained based on the input curved surface width and arc chord length of the to-be-generated curved surface model.

Step S120: Determine, for each sampling point, a coordinate value of the sampling point in a third dimensional direction based on the curved surface parameter, the third dimensional direction being perpendicular to the first dimensional direction and the second dimensional direction.

Specifically, after the two-dimensional coordinate values of the sampling point are determined, the coordinate value of the sampling point in the third dimensional direction is determined by using deduction by using a geometrical relationship.

On this basis, 3D coordinate values of each sampling point may be determined.

Step S130: Generate the curved surface model based on coordinate values of each sampling point in the first dimensional direction, the second dimensional direction, and the third dimensional direction.

After the 3D coordinate values of each sampling point are determined, the curved surface model may be generated based on the 3D coordinate values of each sampling point.

According to the curved surface model generation method in a 3D scenario provided in some embodiments of this application, only a curved surface parameter of a to-be-generated curved surface model needs to be provided. In some embodiments of this application, several sampling points are automatically obtained, a coordinate value of the sampling point in a third dimensional direction is determined by using a geometrical relationship, to accordingly obtain 3D coordinate values of each sampling point, and the curved surface model is generated based on the 3D coordinates of the sampling point. In some embodiments of this application, a large amount of point cloud data does not need to be provided, and a curved surface model of a required curved surface parameter can be generated.

Optionally, a process of obtaining two-dimensional coordinates of a plurality of sampling points in step S110 may be specifically implemented in the following manner:

Uniform sampling is performed in a two-dimensional plane formed by the first dimensional direction of the chord corresponding to the arc at the radial cross section of the curved surface model and the second dimensional direction (i.e., the curved-surface width direction of the curved surface model), to obtain projection points of the plurality of sampling points.

Coordinates of the projection point are used as the two-dimensional coordinates of the sampling point. In the first dimensional direction and the second dimensional direction, differences between coordinate values of adjacent projection points are the same. For example, the sampling points are evenly distributed in the 2D space made of the first dimensional direction and the second dimensional direction. In addition, a coordinate value of the projection point in the first dimensional direction falls within a range of 0 to the arc chord length d, and a coordinate of the projection point in the second dimensional direction falls within a range of 0 to the curved surface width h.

Figure 3:
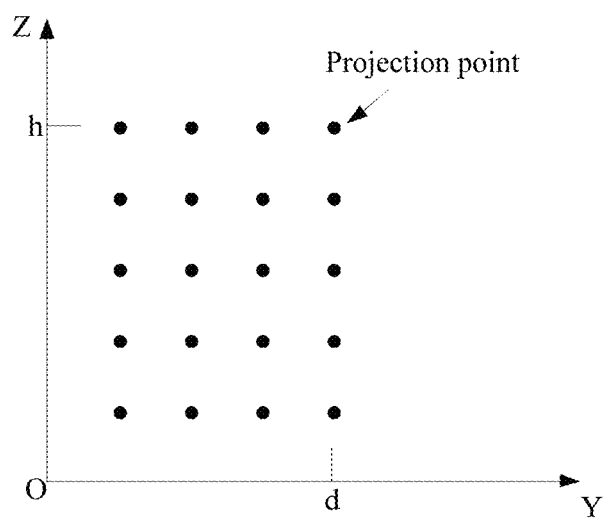
FIG. 3 exemplarily shows a schematic diagram of projection distribution of sampling points in a YOZ plane.

FIG. 3 exemplarily shows a schematic diagram of projection distribution of sampling points in a YOZ plane.

It can be learned from FIG. 3 that, a first dimensional coordinate (namely, a Y-axis coordinate) of the projection point of the sampling point falls within [0, d], and a second dimensional coordinate (namely, a Z-axis coordinate) falls within [0, h]. In addition, the projection points are uniformly distributed in a Y-axis direction and a Z-axis direction.

Certainly, FIG. 3 merely exemplarily shows an optional implementation, and a manner in which the projection points of the sampling points are distributed in the YOZ plane may be another manner, for example, non-uniform distribution.

Further, a process of determining, for each sampling point, a coordinate value of the sampling point in a third dimensional direction based on the curved surface parameter in step S120 is described.

Specifically, for each sampling point, the coordinate value of the sampling point in the third dimensional direction may be determined based on the coordinate value of the sampling point in the first dimensional direction, the length of the chord, and the radian.

The process may be performed through two steps:

S1: Determine, based on the length of the chord and the radian, a radius the arc. The radius of the arc being a radius of a circle of which the arc is a part.

For an implementation process of S1, refer to FIG. 2c:

A vertical line connects a point O to AB in FIG. 2c, and the vertical line, OA (or OB), and AB form a vertical triangle. The radius may be obtained according to the sine value theorem:

S11: Determine a sine value $\sin(\theta/2)$ of a half of the radian.

S12: Determine a ratio $(d/2)/\sin(\theta/2)$ of a half d/2 of the length of the chord to the sine value, and determine the ratio as the radius of the circle in which the arc is located.

S2: Determine the coordinate value of the sampling point in the third dimensional direction based on the coordinate value of the sampling point in the first dimensional direction, the length of the chord, and the radius.

Figure 4:
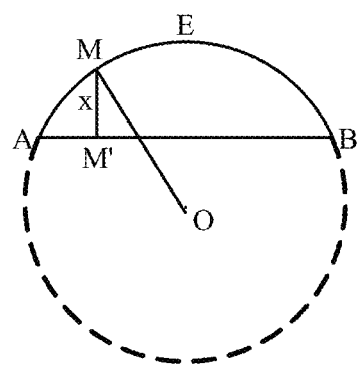
FIG. 4 exemplarily shows a schematic diagram of solving a curved surface height of a sampling point.

An implementation process of S2 may be converted into a mathematical problem, as shown in FIG. 4:

In a circle shown in FIG. 4, a curved surface height x of any sampling point M in any arc AEB in the circle is obtained, where x may be considered as a coordinate value of the sampling point in the third dimensional direction.

A length of a chord AB corresponding to the arc AEB is d, and the sampling point M corresponds to a point M' in the chord AB. The point may be considered as a projection point of the sampling point M in the YOZ plane. Therefore, known parameters are: the radius r of the circle/arc (e.g., length of OM), the length d of the chord AB, a length L of AM', and the length of AM' may be considered as a coordinate value of the sampling point M in the first dimensional direction.

Therefore, a specific implementation process of the foregoing mathematical solving process may include the following steps:

S21: Determine, according to the intersecting chord theorem by using the coordinate values of the sampling point in the first dimensional direction and the third dimensional direction and the length of the chord, a length of another chord that is perpendicular to the chord and passes through the sampling point in the circle in which the arc is located.

S22: Determine that a vertical distance from a circle center of the circle in which the arc is located to the another chord is obtained by subtracting the coordinate value of the sampling point in the first dimensional direction from a half of the length of the chord.

S23: Determine the following equation according to the Pythagorean theorem: a sum of the square of a half of the length of the another chord and the square of the vertical distance from the circle center to the another chord is equal to the square of the radius, and solve the equation to obtain the coordinate value of the sampling point in the third dimensional direction.

Figure 5:
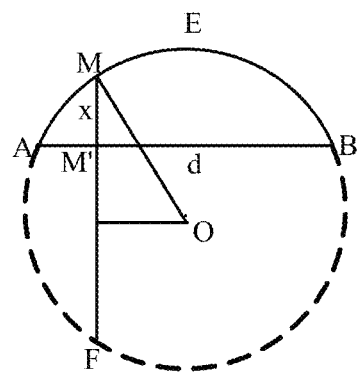
FIG. 5 exemplarily shows another schematic diagram of solving a curved surface height of a sampling point.

The foregoing mathematical solving process may be shown in FIG. 5:

As shown in FIG. 5, the length of AM' is the coordinate value L of the sampling point M in the first dimensional direction, a length of MB is d−L, and the coordinate value of the sampling point M in the third dimensional direction is x.

A length of M'F is defined as y.

The following may be obtained through the intersecting chord theorem:

$$x \cdot y = L \cdot (d - L) \rightarrow y = \frac{L \cdot (d - L)}{x}$$

It can be learned from FIG. 5 that, the vertical line from the circle center O to MF forms a right triangle with MF and OM. The following may be obtained according to the Pythagorean theorem:

$$\left[\frac{1}{2} \cdot \left(x + \frac{L \cdot (d-L)}{x}\right)\right]^2 + \left[\frac{1}{2} \cdot d - L\right]^2 = r^2$$

The foregoing equation is solved, to determine a value of x:

$$x = \frac{\sqrt{-d^2 + 2dL - 2L^2 + 4r^2 + \sqrt{d^2 - 4r^2}\sqrt{(d - 2L)^2 - 4r^2}}}{\sqrt{2}} ; \text{ or}$$

$$x = \frac{\sqrt{-d^2 + 2dL - 2L^2 + 4r^2 - \sqrt{d^2 - 4r^2}\sqrt{(d - 2L)^2 - 4r^2}}}{\sqrt{2}}$$

It can be learned that there are two solutions of the value of x. This is mathematically complete because there is a large arc AFB in addition to the small arc AEB.

Selection of a specific solution may be set by the user. If generation of a small curved surface model is selected, the second solution may be selected. If generation of a large curved surface model is selected, the first solution may be selected.

A process of determining of the coordinate value of the sampling point in the third dimensional direction based on the coordinate value of the sampling point in the first dimensional direction, the length of the chord, and the radian is described above. On this basis, only the radian of the to-be-generated curved surface model, the curved surface width, and the arc chord length need to be input. In some embodiments of this application, 3D coordinates of several sampling points can be automatically generated, and the curved surface model is generated by using the 3D coordinates of the sampling points. After obtaining coordinates of the third dimension, standard approach can be implemented to generate corresponding triangle meshes of the curved surface model by using related API of a 3D engine and using 3D coordinates of sampling points as vertices of the triangle meshes.

The curved surface model generation method in a 3D scenario provided in some embodiments of this application is applicable to a 3D engine of a server, for example, UE4 (Unreal Engine 4). A conventional 3D engine does not support generation of a curved surface model, and therefore, can only generate a planar object model when creating an object model. The curved surface model generation method in a 3D scenario is applied to the 3D engine in some embodiments of this application, so that a curved surface model can be created in the 3D engine, and expressiveness can be enhanced after the curved surface model is added to the 3D scenario.

Figure 6:
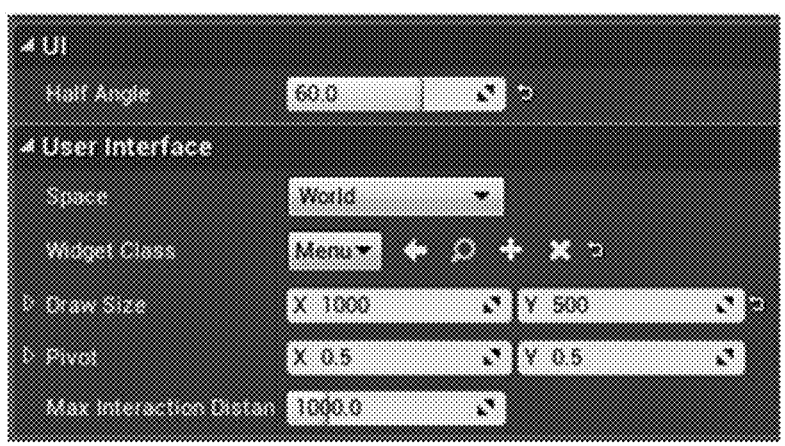
FIG. 6 exemplarily shows a schematic diagram of an interface developed in Unreal Engine 4 (UE4) for generating a curved surface model.

FIG. 6 exemplarily shows a schematic diagram of an interface developed in UE4 for generating a curved surface model (e.g., for obtaining curved surface parameters inputted from a user). An option HalfAngle is used by a user to specify a radian. An option Widget Class is used by the user to specify a resource path of a generated curved surface model. An option Draw Size is used by the user to specify an arc chord length and a curved-surface width of a curved surface. By adjusting these parameters/options, any desired curved surface model can be automatically obtained accordingly.

Figure 7:
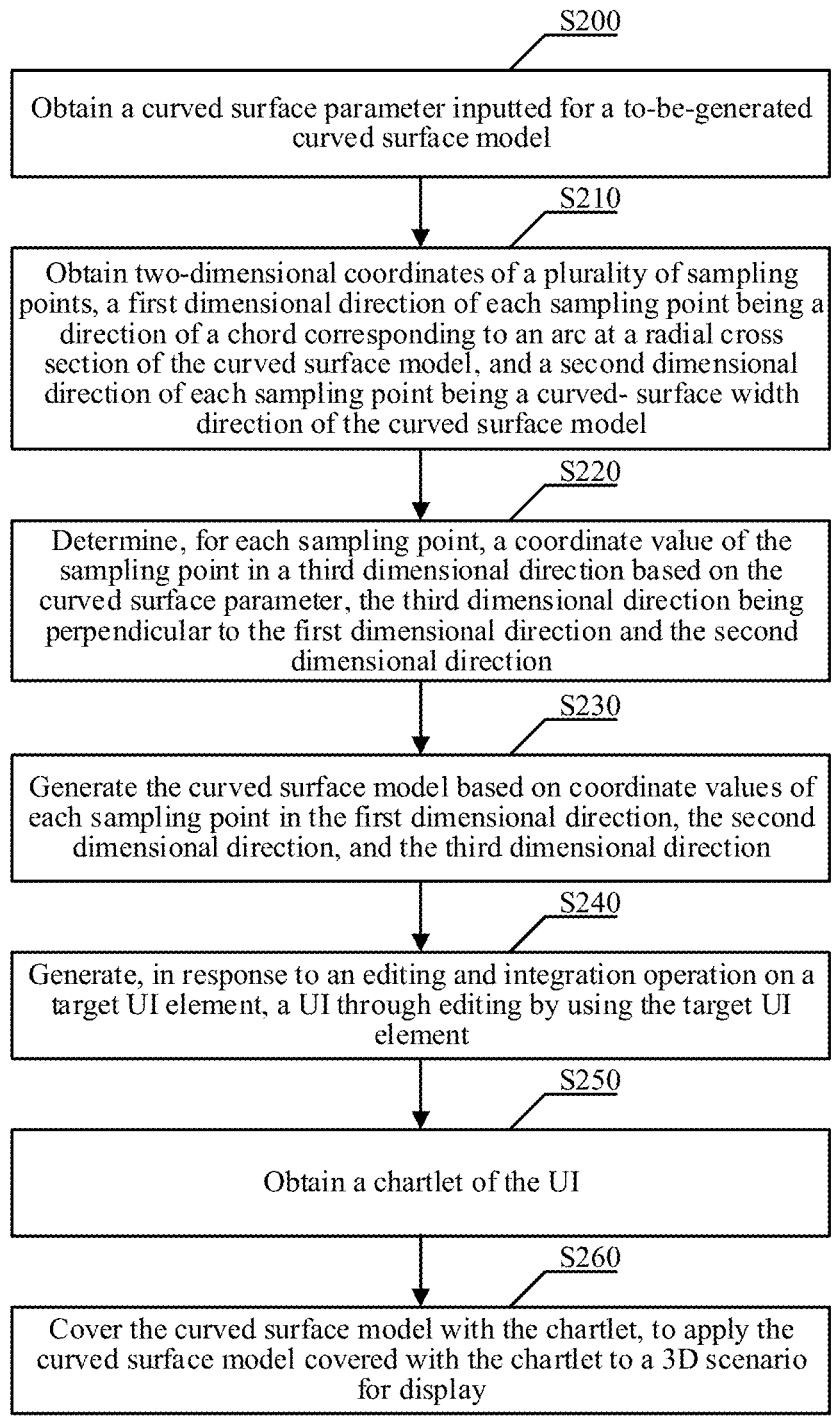
FIG. 7 is a flowchart of another curved surface model generation method in a 3D model according to an embodiment of this application.

Based on the foregoing embodiment, an embodiment of this application further discloses another curved surface model generation method in a 3D scenario. Referring to FIG. 7, the method includes the following steps:

Step S200: Obtain an input curved surface parameter of a to-be-generated curved surface model.

Step S210: Obtain two-dimensional coordinates of a plurality of sampling points, a first dimensional direction of the sampling point being a direction of a chord corresponding to an arc at a radial cross section of the curved surface model, and a second dimensional direction of the sampling point being a curved-surface width direction of the curved surface model.

Step S220: Determine, for each sampling point, a coordinate value of the sampling point in a third dimensional direction based on the curved surface parameter, the third dimensional direction being perpendicular to the first dimensional direction and the second dimensional direction.

A coordinate value of each sampling point in the first dimensional direction falls within a range of 0 to an arc chord length, and a coordinate of each sampling point in the second dimensional direction falls within a range of 0 to a curved surface width.

Step S230: Generate the curved surface model based on coordinate values of each sampling point in the first dimensional direction, the second dimensional direction, and the third dimensional direction.

Step S200 to step S230 are in a one-to-one correspondence with step S100 to step S130. Details are not described herein again.

Step S240: Generate, in response to an editing and integration operation on a target UI element, a UI (e.g., a UI design) through editing by using the target UI element. The UI design being a rendering target to apply the curved surface model and certain texture.

Figure 8:
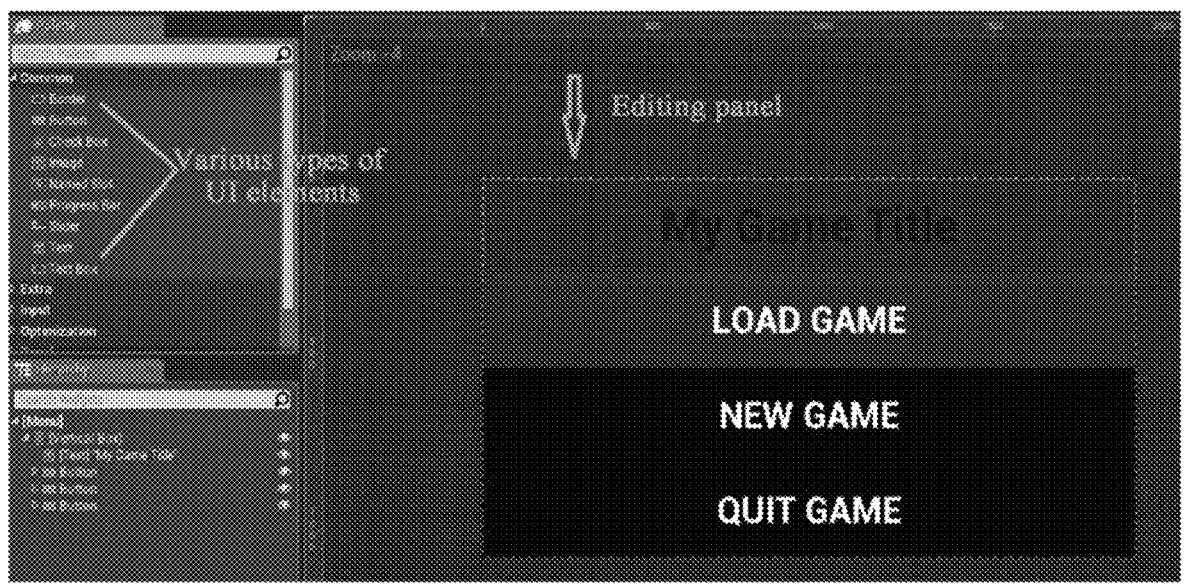
FIG. 8 exemplarily shows a schematic diagram of an editing interface of a user interface (UI) element.

Specifically, a 3D engine provides a UI element editing interface. A user may edit and integrate various types of elements in the interface. In this step, the UI is generated through editing by using the target UI element edited and integrated by the user. FIG. 8 exemplarily shows a schematic diagram of an editing interface of a UI element. Various types of UI elements are displayed in a left list in the interface; and there is an editing panel on the right of the interface, and various UI elements can be edited and processed in the editing panel. The right side shows an exemplary UI design (e.g., a game menu) that the developer is currently working on. The UI design may include one or more UI elements.

Step S250: Obtain a texture of the UI (e.g., the UI design).

Specifically, the UI is already obtained in the previous step, and the texture of the UI is obtained in this step. Common 3D engines all provide a manner of obtaining the texture of the UI, and the texture of the UI may be obtained according to a method provided by the engine.

Step S260: Cover the curved surface model with the texture, to apply the curved surface model covered with the texture to the 3D scenario for display. For example, the texture can be added/mapped to the curved surface model by using Render Target function. Each vertix in the curved surface model can be assigned with a corresponding coordinate of the texture, so that the texture can cover the entire model. In other words, a 2D image texture can wrap a 3D model to produce the integrated outcome.

Specifically, an implementation of the step may include the following steps:

S1: Convert 3D coordinates of each sampling point in the curved surface model into UV coordinates (texture coordinates, U and V being plane axes of the texture).

Specifically, the curved surface model is determined by the 3D coordinates. Each 3D coordinate is equivalent to a vertex. Each vertex includes UV coordinate information used to position a corresponding texture element.

Assuming that the first dimensional direction of the sampling point (vertex) is a Y-axis direction, and the second dimensional direction of the sampling point is a Z-axis direction, a relationship between UV coordinates and YZ coordinates of the vertex is shown as follows:

A value of a Y coordinate falls within a range of 0 to d, and a linearly corresponding U coordinate falls within a range of 0 to 1. If the Y value is 0.5*d, the corresponding U coordinate is 0.5.

A Z coordinate falls within a range of 0 to h, and a linearly corresponding V coordinate falls within a range of 0 to 1. If the Z value is 0.8*h, the corresponding V coordinate is 0.8.

Based on the foregoing correspondence, the 3D coordinates of each sampling point in the curved surface model can be converted into the UV coordinates.

S2: Determine, in the texture for each sampling point, a texture element corresponding to the UV coordinates of the sampling point.

Specifically, the texture is a two-dimensional image. Therefore, each texture element in the texture can be represented by UV coordinates. For each sampling point, the texture element corresponding to the UV coordinates is determined in the texture based on the UV coordinates of the sampling point.

S3: Draw, based on the determined texture element corresponding to the UV coordinates of the sampling point, at a position of the sampling point in the curved surface model, the texture element corresponding to the UV coordinates of the sampling point.

Through the foregoing processing process, the texture can be covered on the curved surface model. The curved surface model covered with the texture (i.e., a finished UI resource such as a prefab in Unity engine, a blueprint in UE4 engine) is loaded into the 3D scenario for display. In the 3D scenario, a position, an orientation, and the like of the curved surface model can be adjusted.

Figure 9:
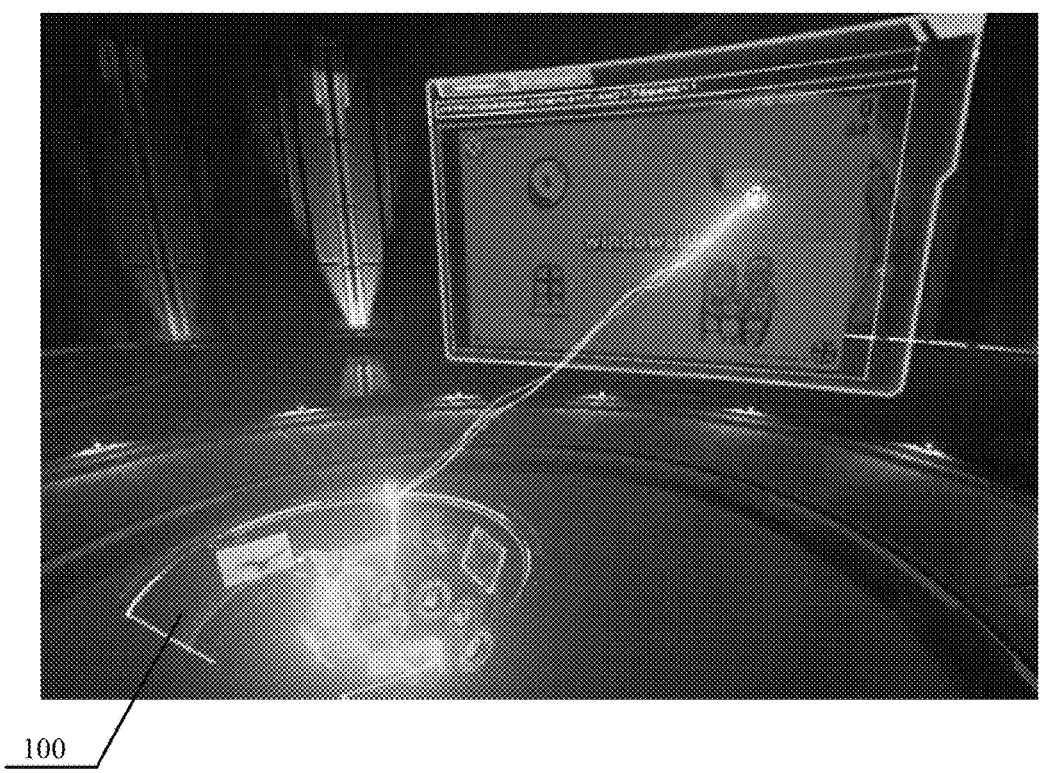
FIG. 9 exemplarily shows a schematic diagram of a 3D scenario of a VR game.

When the curved surface model is displayed in the 3D scenario, 3D expressiveness can be improved, and for a VR game, a feeling of immersion of the user can be greatly enhanced. FIG. 9 exemplarily shows a schematic diagram of a 3D scenario of a VR game. An object model 100 loaded in the scenario is a curved surface model generated according to the solution in some embodiments of this application, and 3D expressiveness is greatly improved through integration with the 3D scenario.

A curved surface model generation apparatus in a 3D scenario provided in an embodiment of this application is described below. Cross-reference may be correspondingly made to the curved surface model generation apparatus in a 3D scenario described below and the curved surface model generation method in a 3D scenario described above.

Figure 10:
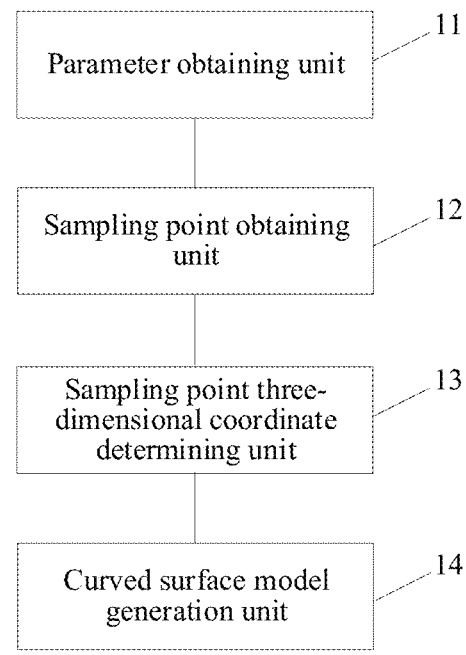
FIG. 10 is a schematic structural diagram of a curved surface model generation apparatus in a 3D model according to an embodiment of this application.

FIG. 10 is a schematic structural diagram of a curved surface model generation apparatus in a 3D scenario according to an embodiment of this application. As shown in FIG. 10, the apparatus includes:

a parameter obtaining unit 11, configured to obtain a curved surface parameter inputted for a to-be-generated curved surface model;

a sampling point obtaining unit 12, configured to obtain two-dimensional coordinates of a plurality of sampling points, a first dimensional direction of the sampling point being a direction of a chord corresponding to an arc at a radial cross section of the curved surface model, and a second dimensional direction of the sampling point being a curved-surface width direction of the curved surface model;

a sampling point 3D coordinate determining unit 13, configured to determine, for each sampling point, a coordinate value of the sampling point in a third dimensional direction based on the curved surface parameter, the third dimensional direction being perpendicular to the first dimensional direction and the second dimensional direction; and a curved surface model generation unit 14, configured to generate the curved surface model based on coordinate values of each sampling point in the first dimensional direction, the second dimensional direction, and the third dimensional direction.

Applying the curved surface model generation apparatus in a 3D scenario in embodiments of this application only needs to provide a curved surface parameter of a to-be-generated curved surface model. The apparatus in some embodiments of this application automatically obtains several sampling points, determines a coordinate value of the sampling point in a third dimensional direction through a geometrical relationship, to accordingly obtain 3D coordinate values of each sampling point, and generates the curved surface model based on the 3D coordinates of the sampling point. In embodiments of this application, a large amount of point cloud data does not need to be provided, and a curved surface model of a required curved surface parameter can be generated.

Optionally, the curved surface parameter includes a radian, a height, and an arc chord length, the arc chord length is a length of the chord corresponding to the arc at the radial cross section of the curved surface model, and the sampling point 3D coordinate determining unit may include:

a first sampling point 3D coordinate determining subunit, configured to determine the coordinate value of the sampling point in the third dimensional direction based on the coordinate value of the sampling point in the first dimensional direction, the length of the chord, and the radian.

Optionally, the first sampling point 3D coordinate determining subunit may include:

a radius length determining unit, configured to determine, based on the length of the chord and the radian, a radius of a circle of which the arc is a part; and a third dimensional coordinate value determining unit, configured to determine the coordinate value of the sampling point in the third dimensional direction based on the coordinate value of the sampling point in the first dimensional direction, the length of the chord, and the radius.

Optionally, the radius length determining unit may include:

a sine value determining unit, configured to determine a sine value of a half of the radian; and a ratio determining unit, configured to: determine a ratio of a half of the length of the chord to the sine value, and determine the ratio as the radius of the circle in which the arc is located.

Optionally, the third dimensional coordinate value determining unit may include:

another chord length determining unit, configured to determine, according to the intersecting chord theorem by using the coordinate values of the sampling point in the first dimensional direction and the third dimensional direction and the length of the chord, a length of another chord that is perpendicular to the chord and passes through the sampling point in the circle in which the arc is located;

a vertical distance determining unit, configured to determine that a vertical distance from a circle center of the circle in which the arc is located to the another chord is obtained by subtracting the coordinate value of the sampling point in the first dimensional direction from a half of the length of the chord; and an equation solving unit, configured to: determine the following equation according to the Pythagorean theorem: a sum of the square of a half of the length of the another chord and the square of the vertical distance from the circle center to the another chord is equal to the square of the radius, and solve the equation to obtain the coordinate value of the sampling point in the third dimensional direction.

Optionally, the sampling point obtaining unit may include:

a uniform sampling unit, configured to perform uniform sampling in a two-dimensional plane formed by the first dimensional direction of the chord corresponding to the arc at the radial cross section of the curved surface model and the second dimensional direction (i.e., the curved-surface width direction of the curved surface model), to obtain projection points of the plurality of sampling points in the two-dimensional plane; and a coordinate determining unit, configured to use coordinates of the projection point as two-dimensional coordinates of the sampling point, where in the first dimensional direction and the second dimensional direction, differences between coordinate values of adjacent projection points are the same.

Optionally, the curved surface model generation apparatus in a 3D scenario is applicable to a 3D engine, and the curved surface model generation apparatus in a 3D scenario in some embodiments of this application may further include:

a UI generation unit, configured to generate, in response to an editing and integration operation on a target UI element, a UI through editing by using the target UI element;

a texture obtaining unit, configured to obtain a texture of the UI; and a texture covering unit, configured to: cover the curved surface model with the texture, to apply the curved surface model covered with the texture to the 3D scenario for display.

Optionally, the texture covering unit may include:

a UV coordinate conversion unit, configured to convert 3D coordinates of each sampling point in the curved surface model into UV coordinates;

a texture element determining unit, configured to determine, in the texture for each sampling point, a texture element corresponding to the UV coordinates of the sampling point; and a texture element drawing unit, configured to draw, based on the determined texture element corresponding to the UV coordinates of the sampling point, at a position of the sampling point in the curved surface model, the texture element corresponding to the UV coordinates of the sampling point.

Figure 11:
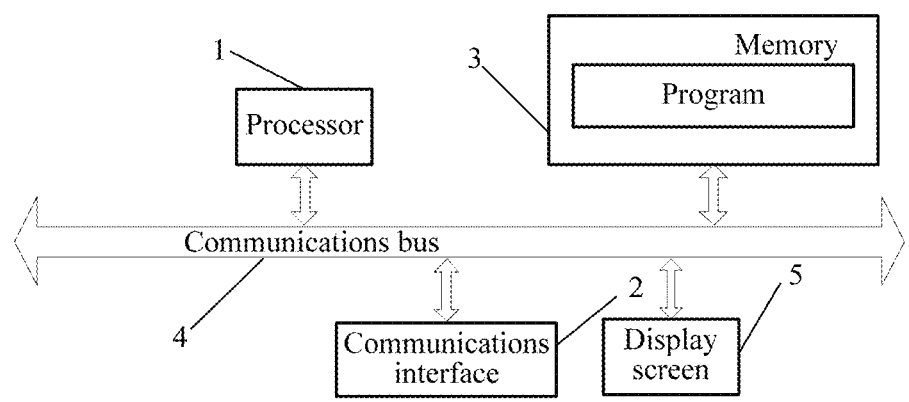
FIG. 11 is a schematic diagram of a hardware structure of a 3D engine server according to an embodiment of this application.

The curved surface model generation apparatus in a 3D scenario in some embodiments of this application is applicable to a 3D engine server, for example, a UE4 server. In the following embodiment, a hardware structure of the 3D engine server for implementing the curved surface model generation apparatus in a 3D scenario in some embodiments of this application is described. FIG. 11 is a schematic diagram of a hardware structure of a 3D engine server according to an embodiment of this application.

As shown in FIG. 11, the 3D engine server may include:

a processor 1, a communications interface 2, a memory 3, a communications bus 4, and a display screen 5.

The processor 1, the communications interface 2, the memory 3, and the display screen 5 complete mutual communication through the communications bus 4.

Optionally, the communications interface 2 may be an interface of a communications module, for example, an interface of a GSM module.

The processor 1 is configured to execute a program.

The memory 3 is configured to store the program.

The program may include program code. The program code includes an operation instruction of the processor.

The processor 1 may be a central processing unit (CPU) or an application-specific integrated circuit (ASIC), or one or more integrated circuits configured to implement the embodiments of this application.

The memory 3 may include a high-speed RAM, and may further include a non-volatile memory, for example, at least one magnetic disk storage.

The program is specifically configured to:

obtain an input curved surface parameter of a to-be-generated curved surface model;

obtain two-dimensional coordinates of a plurality of sampling points, a first dimensional direction of the sampling point being a direction of a chord corresponding to an arc at a radial cross section of the curved surface model, and a second dimensional direction of the sampling point being a curved-surface width direction of the curved surface model;

determine, for each sampling point, a coordinate value of the sampling point in a third dimensional direction based on the curved surface parameter, the third dimensional direction being perpendicular to the first dimensional direction and the second dimensional direction; and generate the curved surface model based on coordinate values of each sampling point in the first dimensional direction, the second dimensional direction, and the third dimensional direction.

In a possible implementation, the curved surface parameter includes a radian, a height, and an arc chord length, the arc chord length is a length of the chord corresponding to the arc at the radial cross section of the curved surface model, and the determining, for each sampling point, a coordinate value of the sampling point in a third dimensional direction based on the curved surface parameter includes:

determining the coordinate value of the sampling point in the third dimensional direction based on the coordinate value of the sampling point in the first dimensional direction, the length of the chord, and the radian.

In a possible implementation, the determining the coordinate value of the sampling point in the third dimensional direction based on the coordinate value of the sampling point in the first dimensional direction, the length of the chord, and the radian includes:

determining, based on the length of the chord and the radian, a radius of a circle in which the arc is located; and determining the coordinate value of the sampling point in the third dimensional direction based on the coordinate value of the sampling point in the first dimensional direction, the length of the chord, and the radius.

In a possible implementation, the determining, based on the length of the chord and the radian, a radius of a circle in which the arc is located includes:

determining a sine value of a half of the radian; and determining a ratio of a half of the length of the chord to the sine value, and determining the ratio as the radius of the circle in which the arc is located.

In a possible implementation, the determining the coordinate value of the sampling point in the third dimensional direction based on the coordinate value of the sampling point in the first dimensional direction, the length of the chord, and the radius includes:

determining, according to the intersecting chord theorem by using the coordinate values of the sampling point in the first dimensional direction and the third dimensional direction and the length of the chord, a length of another chord that is perpendicular to the chord and passes through the sampling point in the circle in which the arc is located;

determining that a vertical distance from a circle center of the circle in which the arc is located to the another chord is obtained by subtracting the coordinate value of the sampling point in the first dimensional direction from a half of the length of the chord; and determining the following equation according to the Pythagorean theorem: a sum of the square of a half of the length of the another chord and the square of the vertical distance from the circle center to the another chord is equal to the square of the radius, and solving the equation to obtain the coordinate value of the sampling point in the third dimensional direction.

In a possible implementation, the obtaining two-dimensional coordinates of a plurality of sampling points includes:

performing uniform sampling in a two-dimensional plane formed by the first dimensional direction of the chord corresponding to the arc at the radial cross section of the curved surface model and the second dimensional direction of the curved surface width of the curved surface model, to obtain projection points of the plurality of sampling points in the two-dimensional plane; and using coordinates of the projection point as two-dimensional coordinates of the sampling point, where in the first dimensional direction and the second dimensional direction, differences between coordinate values of adjacent projection points are the same.

In a possible implementation, the program further includes:

generating, in response to an editing and integration operation on a target UI element, a UI through editing by using the target UI element;

obtaining a texture of the UI; and covering the curved surface model with the texture, to apply the curved surface model covered with the texture to the 3D scenario for display.

In a possible implementation, the covering the curved surface model with the texture includes:

converting 3D coordinates of each sampling point in the curved surface model into UV coordinates;

determining, in the texture for each sampling point, a texture element corresponding to the UV coordinates of the sampling point; and drawing, based on the determined texture element corresponding to the UV coordinates of the sampling point, at a position of the sampling point in the curved surface model, the texture element corresponding to the UV coordinates of the sampling point.

In addition, an embodiment of this application further provides a storage medium, the storage medium being configured to store program code; and the program code being used to perform the curved surface model generation method in a 3D scenario provided in the foregoing embodiment.

An embodiment of this application further provides a computer program product including an instruction, when run on a server, the computer program product causing the server to perform the curved surface model generation method in a 3D scenario provided in the foregoing embodiment.

Finally, it should be further noted that the relational terms herein such as first and second are used merely to differentiate an entity or operation from another entity or operation, and do not require or imply any actual relationship or sequence between these entities or operations. Moreover, the terms "include", "comprise", and any variants thereof are intended to cover a non-exclusive inclusion. Therefore, in the context of a process, a method, an object, or a device that includes a series of elements, the process, the method, the object, or the device not only includes such elements, but also includes other elements not specified expressly, or may include inherent elements of the process, the method, the object, or the device. Unless otherwise specified, an element limited by "include a/an . . . " does not exclude other same elements existing in the process, the method, the object, or the device that includes the element.

The embodiments in this specification are all described in a progressive manner, each embodiment focuses on a difference from other embodiments, and for same or similar parts in the embodiments, refer to these embodiments.

The above descriptions of the disclosed embodiments make a person skilled in the art implement or use this application. Various modifications to these embodiments are obvious to a person skilled in the art, and the general principles defined in this specification may be implemented in other embodiments without departing from the spirit and scope of this application. Therefore, this application is not limited to these embodiments illustrated in this application, but needs to conform to the broadest scope consistent with the principles and novel features disclosed in this application.

What is claimed is:

1. A method of generating a curved surface model, comprising:

obtaining, by a computing device, a curved surface parameter of the curved surface model, wherein the curved surface parameter includes a radian, a height, and an arc chord length, the arc chord length being a length of a chord corresponding to an arc at a radial cross section of the curved surface model;

obtaining, by the computing device, two-dimensional coordinates of each of a plurality of sampling points, the two-dimensional coordinates including a first coordinate value in a first dimensional direction and a second coordinate value in a second dimensional direction, the first dimensional direction being a direction of the chord corresponding to the arc at the radial cross section of the curved surface model, and the second dimensional direction being a curved-surface width direction of the curved surface model;

determining, by the computing device, a third coordinate value of the each of the plurality of sampling points in a third dimensional direction based on the first coordinate value in the first dimensional direction, the arc chord length, and the radian, the third dimensional direction being perpendicular to the first dimensional direction and the second dimensional direction; and generating, by the computing device, the curved surface model based on the first, the second, and third coordinate values of the each of the plurality of sampling points respectively in the first dimensional direction, the second dimensional direction, and the third dimensional direction.

2. The method according to claim 1, wherein the determining the third coordinate value of the each of the plurality of sampling points in the third dimensional direction comprises:

determining, based on the length of the chord and the radian, a radius of the arc; and determining the third coordinate value of the each of the plurality of sampling points in the third dimensional direction based on the first coordinate value of the each of the plurality of sampling points in the first dimensional direction, the length of the chord, and the radius.

3. The method according to claim 2, wherein the determining, based on the length of the chord and the radian, the radius of the arc comprises:

determining a sine value of a half of the radian;

determining a ratio of a half of the length of the chord to the sine value; and determining the ratio as the radius of the arc.

4. The method according to claim 2, wherein the chord is a first chord, and the determining the third coordinate value of the each of the plurality of sampling points in the third dimensional direction comprises:

determining a length of a second chord that is perpendicular to the first chord and passes through the each of the sampling points in a circle in which the arc is located;

determining a vertical distance from a center of the circle to the second chord; and obtaining the third coordinate value of the each of the sampling points in the third dimensional direction according to the length of the second chord and the vertical distance.

5. The method according to claim 1, wherein the obtaining the two-dimensional coordinates of the plurality of sampling points comprises:

performing sampling in a two-dimensional plane formed by the first dimensional direction and the second dimensional direction, to obtain projection points of the plurality of sampling points in the two-dimensional plane; and using coordinates of the projection points as the two-dimensional coordinates of the plurality of sampling points.

6. The method according claim 1, further comprising:

generating, in response to an editing and integration operation on a target user interface (UI) element, a UI design through editing by using the target UI element;

obtaining a texture of the UI design;

covering the curved surface model with the texture; and applying the curved surface model covered with the texture to a 3D (three-dimensional) scenario for display.

7. The method according to claim 6, wherein the covering the curved surface model with the texture comprises:

converting 3D coordinates of the each of the sampling points in the curved surface model into UV coordinates, wherein the UV coordinates are texture coordinates in U and V plane axes of the texture; and determining a texture element corresponding to the UV coordinates of the each of the sampling points in the texture.

8. A curved surface model generation apparatus, comprising: a memory; and a processor coupled to the memory and configured to:

obtain a curved surface parameter of the curved surface model, wherein the curved surface parameter includes a radian, a height, and an arc chord length, the arc chord length being a length of a chord corresponding to an arc at a radial cross section of the curved surface model;

obtain two-dimensional coordinates of a plurality of sampling points, the two-dimensional coordinates including a first coordinate value in a first dimensional direction and a second coordinate value in a second dimensional direction, the first dimensional direction being a direction of the chord corresponding to the arc at the radial cross section of the curved surface model, and the second dimensional direction being a curved-surface width direction of the curved surface model;

determine a third coordinate value of the each of the plurality of sampling points in a third dimensional direction based on the first coordinate value in the first dimensional direction, the arc chord length, and the radian, the third dimensional direction being perpendicular to the first dimensional direction and the second dimensional direction; and generate the curved surface model based on the first, the second, and third coordinate values of the each of the plurality of sampling points respectively in the first dimensional direction, the second dimensional direction, and the third dimensional direction.

9. The apparatus according to claim 8, wherein in determining the third coordinate value of the each of the plurality of sampling points in the third dimensional direction, the processor is further configured to:

determine, based on the length of the chord and the radian, a radius of the arc; and determine the third coordinate value of the each of the plurality of sampling points in the third dimensional direction based on the first coordinate value of the each of the plurality of sampling points in the first dimensional direction, the length of the chord, and the radius.

10. The apparatus according to claim 9, wherein in determining, based on the length of the chord and the radian, the radius of the arc, the processor is further configured to:

determine a sine value of a half of the radian;

determine a ratio of a half of the length of the chord to the sine value; and determine the ratio as the radius of the arc.

11. The apparatus according to claim 9, wherein the chord is a first chord, and in determining the third coordinate value of the each of the sampling points in the third dimensional direction, the processor is further configured to:
   determine a length of a second chord that is perpendicular to the first chord and passes through the each of the sampling points in a circle in which the arc is located;
   determine a vertical distance from a center of the circle to the second chord; and
   obtain the third coordinate value of the each of the sampling points in the third dimensional direction according to the length of the second chord and the vertical distance.

12. The apparatus according to claim 8, wherein in obtaining the two-dimensional coordinates of the plurality of sampling points, the processor is further configured to:
   perform sampling in a two-dimensional plane formed by the first dimensional direction and the second dimensional direction, to obtain projection points of the plurality of sampling points in the two-dimensional plane; and
   use coordinates of the projection points as the two-dimensional coordinates of the plurality of sampling points.

13. The apparatus according claim 8, wherein the processor is further configured to:
   generate, in response to an editing and integration operation on a target user interface (UI) element, a UI design through editing by using the target UI element;
   obtain a texture of the UI design;
   cover the curved surface model with the texture; and
   apply the curved surface model covered with the texture to a 3D (three-dimensional) scenario for display.

14. The apparatus according to claim 13, wherein in covering the curved surface model with the texture, the processor is further configured to:
   convert 3D coordinates of the each of the sampling points in the curved surface model into UV coordinates, wherein the UV coordinates are texture coordinates in U and V plane axes of the texture; and
   determine a texture element corresponding to the UV coordinates of the each of the sampling points in the texture.

15. A non-transitory computer-readable storage medium storing computer program instructions executable by at least one processor to perform:
   obtaining a curved surface parameter of the curved surface model, wherein the curved surface parameter includes a radian, a height, and an arc chord length, the arc chord length being a length of a chord corresponding to an arc at a radial cross section of the curved surface model;
   obtaining two-dimensional coordinates of a plurality of sampling points, the two-dimensional coordinates including a first coordinate value in a first dimensional direction and a second coordinate value in a second dimensional direction, the first dimensional direction being a direction of the chord corresponding to the arc at the radial cross section of the curved surface model, and the second dimensional direction being a curved-surface width direction of the curved surface model;
   determining a third coordinate value of the each of the plurality of sampling points in a third dimensional direction based on the first coordinate value in the first dimensional direction, the arc chord length, and the radian, the third dimensional direction being perpendicular to the first dimensional direction and the second dimensional direction; and
   generating the curved surface model based on the first, the second, and third coordinate values of the each of the plurality of sampling points respectively in the first dimensional direction, the second dimensional direction, and the third dimensional direction.

16. The storage medium according to claim 15, wherein the obtaining the two-dimensional coordinates of the plurality of sampling points comprises:
   performing sampling in a two-dimensional plane formed by the first dimensional direction and the second dimensional direction, to obtain projection points of the plurality of sampling points in the two-dimensional plane; and
   using coordinates of the projection points as the two-dimensional coordinates of the plurality of sampling points.

17. The storage medium according claim 15, wherein the computer program instructions further cause the at least one processor to perform:
   generating, in response to an editing and integration operation on a target user interface (UI) element, a UI design through editing by using the target UI element;
   obtaining a texture of the UI design;
   covering the curved surface model with the texture; and
   applying the curved surface model covered with the texture to a 3D (three-dimensional) scenario for display.

18. The storage medium according to claim 17, wherein the covering the curved surface model with the texture comprises:
   converting 3D coordinates of the each of the sampling points in the curved surface model into UV coordinates, wherein the UV coordinates are texture coordinates in U and V plane axes of the texture; and
   determining a texture element corresponding to the UV coordinates of the each of the sampling points in the texture.

19. The storage medium according to claim 15, wherein the determining the third coordinate value of the each of the plurality of sampling points in the third dimensional direction comprises:
   determining, based on the length of the chord and the radian, a radius of the arc; and
   determining the third coordinate value of the each of the plurality of sampling points in the third dimensional direction based on the first coordinate value of the each of the plurality of sampling points in the first dimensional direction, the length of the chord, and the radius.

20. The storage medium according to claim 19, wherein the determining, based on the length of the chord and the radian, the radius of the arc comprises:
   determining a sine value of a half of the radian;
   determining a ratio of a half of the length of the chord to the sine value; and
   determining the ratio as the radius of the arc.

* * * * *